United States Patent [19]

Englund

[11] Patent Number: 5,207,537
[45] Date of Patent: May 4, 1993

[54] CUTTING TOOL
[75] Inventor: Kjell Englund, Valbo, Sweden
[73] Assignee: Sandvik AB, Sandviken, Sweden
[21] Appl. No.: 804,687
[22] Filed: Dec. 11, 1991
[30] Foreign Application Priority Data Dec. 18, 1990 [SE] Sweden .................. 9004032

[51] Int. Cl.5 ............................. B23B 29/04
[52] U.S. Cl. ....................... 407/110; 407/50
[58] Field of Search ............. 407/109, 110, 117, 50, 407/108

[56] References Cited

U.S. PATENT DOCUMENTS

| 2,922,219 | 1/1960 | Scott | 407/110 |
|---|---|---|---|
| 3,523,349 | 8/1970 | Pollington et al. | 407/110 |
| 3,646,649 | 3/1972 | Oaks et al. | 407/117 |
| 3,655,969 | 4/1972 | Pollington et al. | 407/110 |
| 3,693,224 | 9/1972 | Bartoszevicz | 407/117 |
| 3,775,818 | 12/1973 | Sirola | 407/110 |
| 3,785,021 | 1/1974 | Norgren | 407/110 |
| 4,270,422 | 6/1981 | Anderson | 407/101 |
| 4,357,123 | 11/1982 | Zweekly | 407/110 |
| 4,363,576 | 12/1982 | Zweekly | 407/50 |
| 4,580,930 | 4/1986 | Zinner | 407/110 |
| 4,887,945 | 12/1989 | Pano | 407/110 |
| 4,938,640 | 7/1990 | Pano et al. | 407/110 |

FOREIGN PATENT DOCUMENTS

| 2755003 | 6/1978 | Fed. Rep. of Germany | 407/109 |
|---|---|---|---|
| 8804365 | 11/1988 | Fed. Rep. of Germany . | |
| 3942585 | 7/1990 | Fed. Rep. of Germany | 407/110 |
| 1400790 | 12/1986 | U.S.S.R. . | |

Primary Examiner—Steven C. Bishop
Attorney, Agent, or Firm—Burns, Doane, Swecker & Mathis

[57] ABSTRACT

A parting or grooving tool includes a narrow support blade and a cutting insert removably securable in a recess formed by upper and lower jaws at the front portion of the blade. The inert is clamped into place by an actuator which engages in a slot that extends at an angle in relation to the longitudinal axis of the recess such that the lower jaw is subjected to an elastic bending of such nature that a downwardly directed clamping force is exerted towards the upper surface of the cutting insert.

5 Claims, 2 Drawing Sheets

CUTTING TOOL

BACKGROUND OF THE INVENTION

The present invention relates to a cutting tool for chip cutting machining of metallic workpieces, preferably for parting and grooving operations.

U.S. Pat. No. 3,785,021 discloses a cutting tool of the aforesaid type comprising a support blade the front portion of which is provided with a recess for receiving a cutting insert. The recess forms upper and lower jaws having a bottom support surface and an integral upper clamp surface which can be actuated so as to be brought into clamping contact with the cutting insert. The insert is clamped by means of the spring-load that arises from bending the upper jaw upwards in cantilever fashion upon insertion of the insert into the recess. In order to release the insert from the recess, a special tool is inserted into the recess at a location behind the insert and urge the clamp outwardly.

Such a clamping, however, has been found to be unstable under certain conditions, e.g., under the influence of large cutting forces and heavy vibrations.

It is an object of the present invention to provide a tool in which the insert can be clamped into its mating recess in a support blade by actuation of a clamping device of such nature that the insert can, with greater certainty, maintain its position in a clamped position even under the influence of large cutting forces and heavy vibrations in such tool.

It is another object to provide a toolholder which facilitates the clamping of inserts in various holders with mainly the same clamping force.

It is another object to improve the clamping ability towards the insert while minimizing the risk of tool failure.

SUMMARY OF THE INVENTION

The present invention relates to a metal cutting tool comprising a holder which includes a narrow support blade having a front end defined by upper and lower jaw portions spaced apart by an insert-receiving recess. The upper jaw portion is elastically flexible in cantilever fashion to impart a clamping force to an insert disposed in the recess. A slot is formed in the blade in spaced relationship to the recess and forms an oblique angle relative to a longitudinal axis of the recess. An actuator is mounted in the blade substantially coplanar with the recess and slot. The actuator intersects the slot and is engageable with a wall of the slot. When the actuator is pushed against that wall of the slot, the upper jaw portion is elastically bent to impose the clamping force against an insert in the recess.

Preferably, the actuator comprises a pin which is movable in a direction substantially perpendicular to the slot. A cylindrical bore is preferably formed in the blade and extends substantially perpendicularly to the slot. The pin is movably disposed within that bore.

Preferably, a pin displacing device is engageable with an end of the pin which is opposite the pin end that engages the wall of the slot. The pin displacing device displaces the pin against that wall in order to elastically bend the upper jaw portion.

The pin-displacing device preferably comprises a wedge member which is insertable into a bore of the holder rearwardly of the slot. A threaded screw displaces the wedge member into the bore for pushing against the pin.

Preferably, a second slot is formed in the blade and communicates with a rear end of the recess. The second slot is substantially aligned with the first slot and is spaced therefrom.

The first and second slots preferably form an obtuse angle relative to a longitudinal axis of the slot. That angle is preferably from 130°–160°.

The actuator preferably comprises a screw threadedly disposed in the blade such that an end of the screw pushes against the wall of the slot, and the rest of the screw elastically bends the upper jaw portion into clamping engagement with an insert in the recess.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
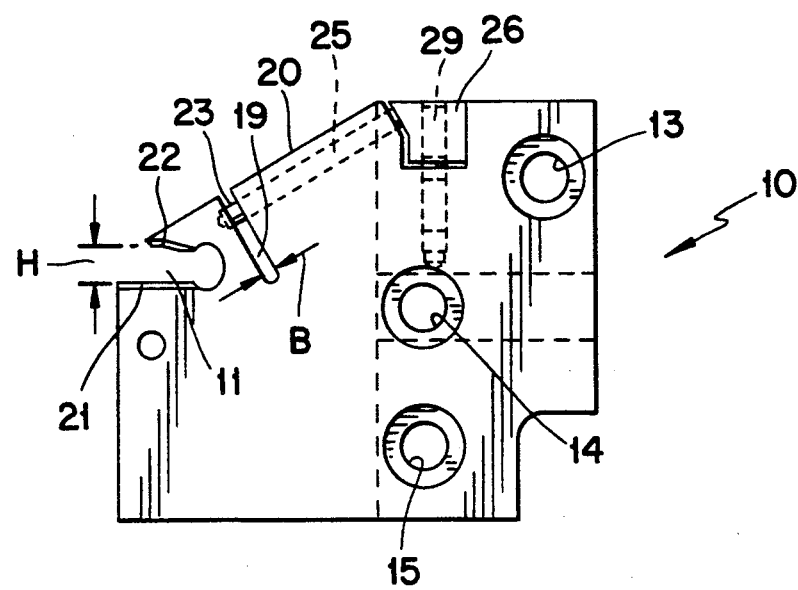
FIG. 1 is a side elevational view of a tool holder according to the present invention.
Figure 2:
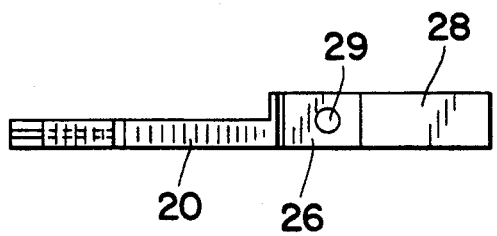
FIG. 2 is a plan view of the tool holder shown in FIG. 1.
Figure 3:
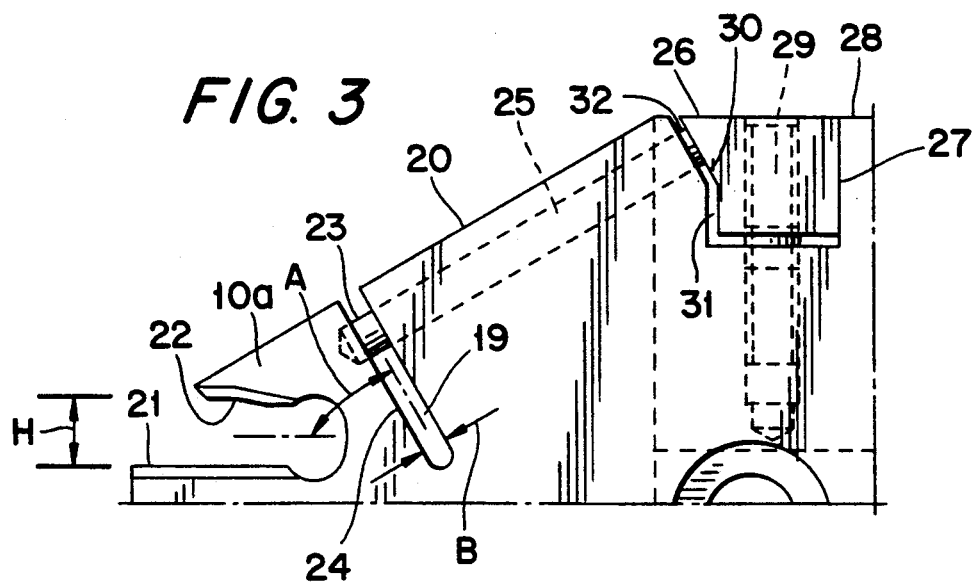
FIG. 3 is an enlarged side view of the embodiment shown in FIGS. 1–2.

A tool according to FIGS. 1–3 comprises a support blade 10, the front end of which is provided with a recess 11 for the receipt of a correspondingly designed cutting insert 12. The front end of the blade is thus separated into upper and lower clamping jaws. The insert includes front and rear ends and has a cutting edge 12a at its front end and a rearwardly extending shank. The shank includes top and bottom surfaces, each of which includes a groove. Each groove is of V-shaped cross section formed by first and second front-to-rear extending surfaces in generally V-shaped relationship.

The insert 12 is made of cemented carbide, ceramic material or another material suitable for metal cutting operations. The support blade 10 is intended to be clamped to a tool holder by means of three locking screws 16, 17, 18 intended to be engaged with three bores 13, 14, 15 separated from each other in the blade 10.

The support blade 10 is provided with a first slot 19 separated from the recess 11. The first slot 19 extends to an inclined front exterior surface 20 of the blade, whereby said first slot 19 extends obliquely in relation to the longitudinal axis of the insert-receiving recess 11. The width B of the first slot 19 is considerably smaller than the height H of the recess 11. The recess 11 is defined by a bottom supporting surface 21 and an upper surface 22 formed in the upper and lower jaw portions of the blade. Both surfaces extend in front-to-rear directions and form projections which are V-shaped in cross section. The insert 12 is correspondingly V-shaped in its upper surface and in its lower bottom surface as indicated earlier, so as to mate with the projections.

The first slot 19 is oriented at an acute angle of 40°-60° in relation to the longitudinal axis of the recess 11. An actuable pressure means 23 is located in the support blade in such a manner that one of its end surfaces is in surface contact with a wall 24 of the first slot 19 that is located closest to the insert-receiving recess 11.

This pressure means 23 comprises a cylindrical pin rotatably movable around an axis in the plane of the support blade and received in a corresponding cylindrical bore 25. The bore 25 is oriented perpendicularly to the longitudinal direction of the first slot 19 and parallel to the exterior front surface 20 of the support blade.

In order to impart an axial movement to the pin 23 toward the slot 19, a wedge nut 26 is received in a correspondingly shaped bore 27 located in a horizontal top surface 28 that extends parallel with the bottom supporting surface 21 of the recess 11. This nut 26 is movable in its longitudinal direction upon actuation of a screw 29 which is centrally located in a bore of the nut and threadably engaged in the support blade 10. One inclined side wall 30 of the nut 26 is oriented substantially parallel with the first slot 19 and perpendicularly in relation to the bore 25. At the same time, the nut 26 is arranged with a certain clearance 31 with a side wall of the bore through which the upper end 32 of the pin 23 extends. An axial movement downwards of the nut 26 will therefore produce surface contact between the side wall 30 and the end 32 of the pin to induce an axial downward displacement of the pin 23. Hence, the lower end of the pin will push the upper surface 22 of the recess 11 toward the lower surface 21 thereof so that a sufficient clamp force can be exerted on the cutting insert 12 to establish a firm clamping of the insert.

Figure 4:
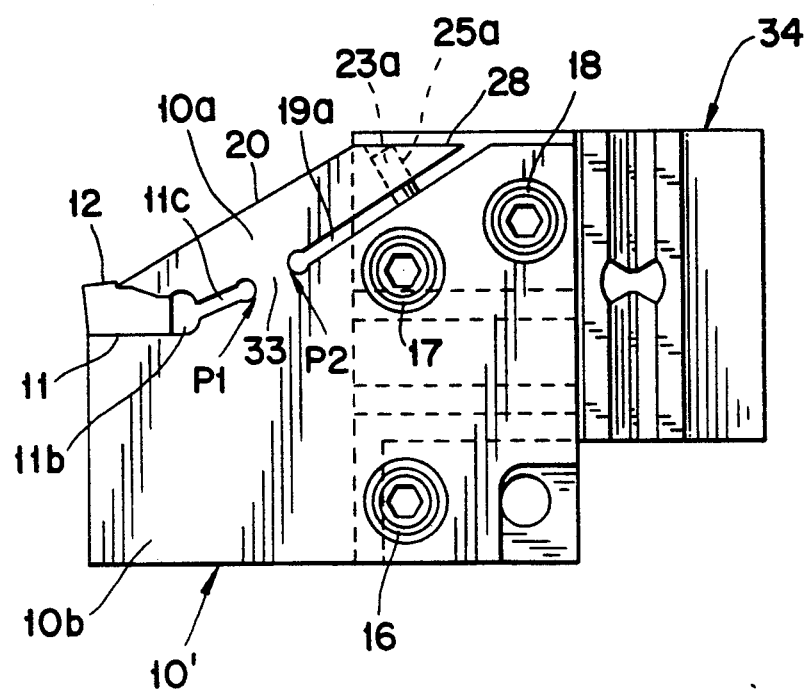
FIG. 4 is a side elevational view of a cutting tool according to an alternative embodiment of the invention.
Figure 5:
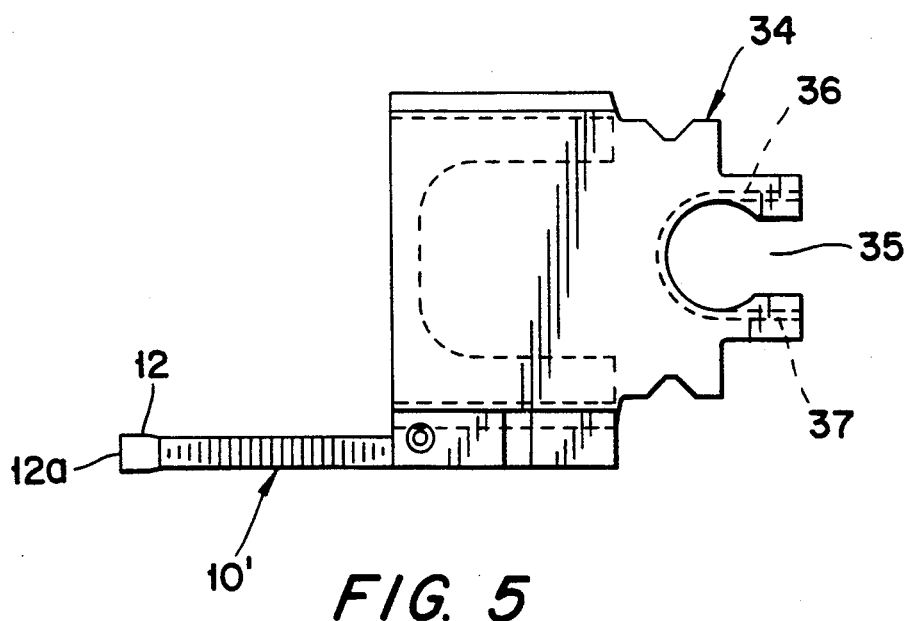
FIG. 5 is a plan view of the tool shown in FIG. 4.

A second toolholder embodiment shown in FIGS. 4-5 comprises a support blade 10,, constituted by an upper portion 10a which is in the shape of a clamp jaw integral with the remainder of the blade, and a lower jaw 10b. A forwardly open recess 11 is provided for the receipt of a correspondingly designed cutting insert 12. A first slot 19a opens at the top surface 28 and extends parallel to the inclined front surface 20. The lower end of the first slot 19a terminates at a distance rearwardly of the recess 11. The rear portion of the recess 11 comprises a smoothly rounded recess portion 11b which communicates with a narrower second slot 11c extending parallel with the exterior surface 20. The second slot 11c is generally aligned with the first slot 19a, whereby the second and first slots are separated by a bridge portion 33 integral with the remainder of the blade 10. As an alternative, it is possible to have the second slot 11c oriented at an inclined angle of up to 10° in relation to the longitudinal extension of the recess 11.

There is a cylindrical clamp screw 23a provided in a corresponding bore 25a of the support blade. The bore 25a is oriented at a right angle relative to the first slot 19a. The arrangement is such that by threadably engaging the screw 23a farther into its bore 25a, its inner end portion will be brought into surface contact with the opposite wall of the first slot 19a such that an elastic bending of the upper jaw 10a of the blade occurs which will cause a downward clamping force to be exerted from the clamp jaw 10a against the cutting insert 12.

In practice, an insert 12 is pushed into the recess 11a, causing the recess 11a to be pushed farther open. In so doing, a tensile force is imparted to the end wall $P_1$ of the second slot 11c, and a compression force is imparted to the end wall $P_2$ of the first slot 19a. After the insert 12 has been pushed into its recess 11a, the clamping effect from the upper portion 10a will be intensified by threadably inserting the clamp screw 23a farther into its bore 25a. This will produce a tensile force in the end wall $P_2$. Hence, a typical tensile condition will be obtained in the intermediate wall portion 33. This is of great importance when it becomes necessary to perform grooving at large axial depths.

The rear portion of the support blade 10 or 10' is secured to an adapter 34 by means of three locking screws 16, 17, 18 which are received in corresponding bores 15, 14 and 13 of the blade while threadably engaging correspondingly aligned bores transversely in the adapter 34. The rear portion of the adapter 34 is provided with a smoothly rounded recess 35 into which a draw bar (not shown) is intended to engage while simultaneously being longitudinally movable in a separate holder body (not shown). The recess 35 is defined by two projections 36 and 37. The more detailed construction of the draw bar and its arrangement in its holder body and its engagement with the recess 35 will appear more clearly from the description given in U.S. Pat. No. 4,270,422 which is hereby incorporated by reference.

Although the invention has been described in connection preferred embodiments thereof, it will be appreciated by those skilled in the art that additions, modifications, substitutions, and deletions not specifically described may be made without departing from the spirit and scope of the invention as defined in the appended claims.

What is claimed is:

1. A metal cutting tool comprising a holder including a narrow support blade having a front end defined by upper and lower jaw portions spaced apart by an insert-receiving recess, said upper jaw portion being elastically flexible in cantilever fashion to impart a clamping force to an insert disposed in said recess, a slot formed in said blade in spaced relationship to said recess and forming an oblique angle relative to a longitudinal axis of said recess, an actuating pin mounted in said blade substantially coplanar with said recess and said slot and movable in a direction substantially perpendicular to said slot, said actuating pin intersecting said slot and being engageable with a wall of said slot, means for pushing said actuating pin against said wall of said slot for elastically bending said upper jaw portion to impose said clamping force against an insert in said recess, said pin-pushing means engageable with an end of said actuating pin opposite an end thereof which engages said wall of said slot, for displacing said actuating pin against said wall, said pin-pushing means comprising a wedge member insertable in a bore of said holder rearwardly of said slot, and a threaded screw for displacing said wedge member into said bore for pushing against said pin.

2. A tool according to claim 1, wherein said oblique angle is from 40 to 60 degrees.

3. A tool according to claim 1 including a cylindrical bore formed in said blade and extending substantially perpendicularly to said slot, said pin being movably disposed in said bore.

4. A tool according to claim 1, wherein said bore extends substantially parallel to an inclined front surface of said blade.

5. A tool according to claim 1, wherein said wedge member includes a pushing surface oriented at an angle relative to said screw and perpendicularly to said pin, said pushing surface engaging said pin.

* * * * *